(12) United States Patent
Partipilo

(10) Patent No.: US 12,201,246 B2
(45) Date of Patent: Jan. 21, 2025

(54) PORTABLE TOILET SYSTEM

(71) Applicant: Linda Partipilo, Las Vegas, NV (US)

(72) Inventor: Linda Partipilo, Las Vegas, NV (US)

(*) Notice: Subject to any disclaimer, the term of this patent is extended or adjusted under 35 U.S.C. 154(b) by 230 days.

(21) Appl. No.: 17/946,214

(22) Filed: Sep. 16, 2022

(65) Prior Publication Data

US 2023/0233041 A1     Jul. 27, 2023

Related U.S. Application Data

(60) Provisional application No. 63/302,165, filed on Jan. 24, 2022.

(51) Int. Cl.
| | |
|---|---|
| A47K 11/04 | (2006.01) |
| A47K 11/02 | (2006.01) |
| A47K 13/00 | (2006.01) |
| A47K 13/14 | (2006.01) |

(52) U.S. Cl.
CPC .......... *A47K 11/045* (2013.01); *A47K 11/026* (2013.01); *A47K 13/005* (2013.01); *A47K 13/14* (2013.01)

(58) Field of Classification Search
CPC ................ A47K 11/045; A47K 11/026; A47K 13/005; A47K 13/14
USPC ................... 4/449, 456, 460, 479, 483, 484
See application file for complete search history.

(56) References Cited

U.S. PATENT DOCUMENTS

| | | | | |
|---|---|---|---|---|
| 3,605,127 | A * | 9/1971 | Dailey | A61G 9/003 4/484 |
| 3,628,197 | A * | 12/1971 | Leventhal | A47K 11/045 4/456 |
| 6,385,790 | B1 * | 5/2002 | Abraham | A47K 11/02 4/479 |
| 6,718,565 | B1 * | 4/2004 | Cruz | E04H 1/1216 4/476 |
| 7,631,371 | B2 * | 12/2009 | Dollar | A45C 15/00 4/449 |
| 2023/0248191 | A1 * | 8/2023 | Wells | A47K 13/005 4/237 |

FOREIGN PATENT DOCUMENTS

| | | | |
|---|---|---|---|
| CN | 106704143 A | * | 5/2017 |
| WO | WO-9103199 A1 | * | 3/1991 |

* cited by examiner

*Primary Examiner* — Tuan N Nguyen
(74) *Attorney, Agent, or Firm* — Brennan, Manna & Diamond, LLC

(57) ABSTRACT

The present invention relates generally to the field of toilets. More specifically, the present invention relates to a portable toilet system primarily comprised of at least one inflatable toilet, at least one privacy screen, and at least one pump. The inflatable toilet can further be inflated, manually or using the pump, wherein the privacy screen can then be erected around the toilet such that a user can defecate or urinate in a bowl member within the toilet that has a waste bag liner. The system may also be comprised of wet wipes and a water bottle to allow a user to clean themselves. All components of the system may further be stored within a carrying case.

17 Claims, 4 Drawing Sheets

PORTABLE TOILET SYSTEM

CROSS-REFERENCE TO RELATED APPLICATION

The present application claims priority to, and the benefit of, U.S. Provisional Application No. 63/302,165, which was filed on Jan. 24, 2022, and is incorporated herein by reference in its entirety.

FIELD OF THE INVENTION

The present invention relates generally to the field of toilets. More specifically, the present invention relates to a portable toilet system primarily comprised of at least one inflatable toilet, at least one privacy screen, and at least one pump. The inflatable toilet can further be inflated manually or using the pump, wherein the privacy screen can then be erected around the toilet such that a user can defecate or urinate in a bowl member within the toilet which has a waste bag liner. The system may also be comprised of wet wipes and a water bottle to allow a user to clean themselves. All components of the system may further be stored within a carrying case. Accordingly, the present disclosure makes specific reference thereto. Nonetheless, it is to be appreciated that aspects of the present invention are also equally applicable to other like applications, devices and methods of manufacture.

BACKGROUND

Many individuals may have to use the restroom in locations where public restrooms are not accessible or available. In this manner, individuals may be forced to urinate or defecate in public places or in view of other individuals. In addition to being incredibly embarrassing, urinating or defecating in this manner is uncomfortable and lacks the basic amenities provided in a restroom.

Therefore, there exists a long-felt need in the art for a system that provides a user with the amenities and comforts of a restroom. Further, there exists a long-felt need in the art for a portable toilet system that provides a user with the amenities and comforts of a restroom and wherein the system can be used wherever needed. In addition, there exists a long-felt need in the art for a portable toilet system that can be used in public while concealing the user from view and provides privacy.

The subject matter disclosed and claimed herein, in one embodiment thereof, comprises a portable toilet system. The system is comprised of a portable toilet system primarily comprised of at least one inflatable toilet, at least one privacy screen, and at least one pump. The inflatable toilet can further be inflated manually or using the pump. The privacy screen can then be erected around the toilet such that a user can defecate or urinate in a bowl member within the toilet that has a waste bag liner. The system may also be comprised of wet wipes and a water bottle to allow a user to clean themselves. All components of the system may further be stored within a carrying case.

In this manner, the portable toilet system of the present invention accomplishes all of the foregoing objectives and provides a user with the amenities and comforts of a restroom. Further, in providing a user with the amenities and comforts of a restroom, the system can also be used wherever needed. In addition, the system can be used in public while concealing the user from view and provides privacy.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a portable toilet system primarily comprised of at least one inflatable toilet, at least one privacy screen, and at least one pump. The toilet preferably has a body that is generally cylindrical in shape. The body further has a top opening that receives at least one bowl member. The bowl member preferably has a lip that circumferentially surrounds the top of the bowl member. As a result, the bowl member can be placed into the top opening in a removable fashion, wherein the lip rests on the top surface of the body of the toilet. The bowl member further collects feces and urine from a user as they use the toilet. The bowl member may receive at least one waste bag liner that can be placed into the bowl member prior to defecating or urinating in the bowl member.

The body may further be manually inflated (i.e., blowing) using at least one valve that is preferably located on the side surface of the body. In one embodiment, the system is comprised of at least one air pump that can be used to inflate the body. The air pump is further comprised of at least one battery which may be recharged by a USB port. The battery further powers at least one motor which then powers at least one fan that blows air through a nozzle which can be inserted into the valve to inflate the toilet.

The system is also comprised of a privacy screen which is preferably collapsible and has a body that is preferably rectangular in shape. The body may further have at least one opening that receives at least one frame member that can be inserted into the body to give the body structural support. The body preferably has no top wall or bottom wall to allow a user to stand comfortably within the body.

In addition, the system may be comprised of at least one wet wipe and/or toilet paper wipe or similar wipe of the like. The system may also include at least one water bottle that a user can use to clean the bowl member or their buttocks and/or genitals as needed. All components of the system can be stored in a carrying case when not in use and for transport purposes.

The system may also be comprised of a method of using the system. First, the toilet, privacy screen, pump, wipes, waste bag liner, and water bottle can be removed from the carrying case. Next, the privacy screen can be erected by inserting the frame member into the body of the screen, wherein the toilet can then be inflated manually or by using the pump. Next, the toilet can be placed within the privacy screen such that the screen surrounds the toilet. Then, a user can then place the bowl member into the top surface of the body and place a waste bag liner into the bowl member. A user can then sit on the toilet and defecate or urinate into the bowl member and a user can use wipes as needed to clean themselves. Then, the waste bag liner can be removed from the bowl member and disposed of. The water bottle can then be used to clean the bowl member or toilet as needed. Next, the toilet can be deflated, and the privacy screen can be unassembled by removing the frame member from the body.

Finally, the toilet, privacy screen, pump, wipes, waste bag liner, and water bottle can be placed back into the carrying case.

Accordingly, the portable toilet system of the present invention is particularly advantageous as it provides a user with the amenities and comforts of a restroom. Further, the system can be used wherever needed while concealing the user from view and providing privacy. In this manner, the portable toilet system provides a novel portable restroom solution that can be used when traditional restrooms are not available.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
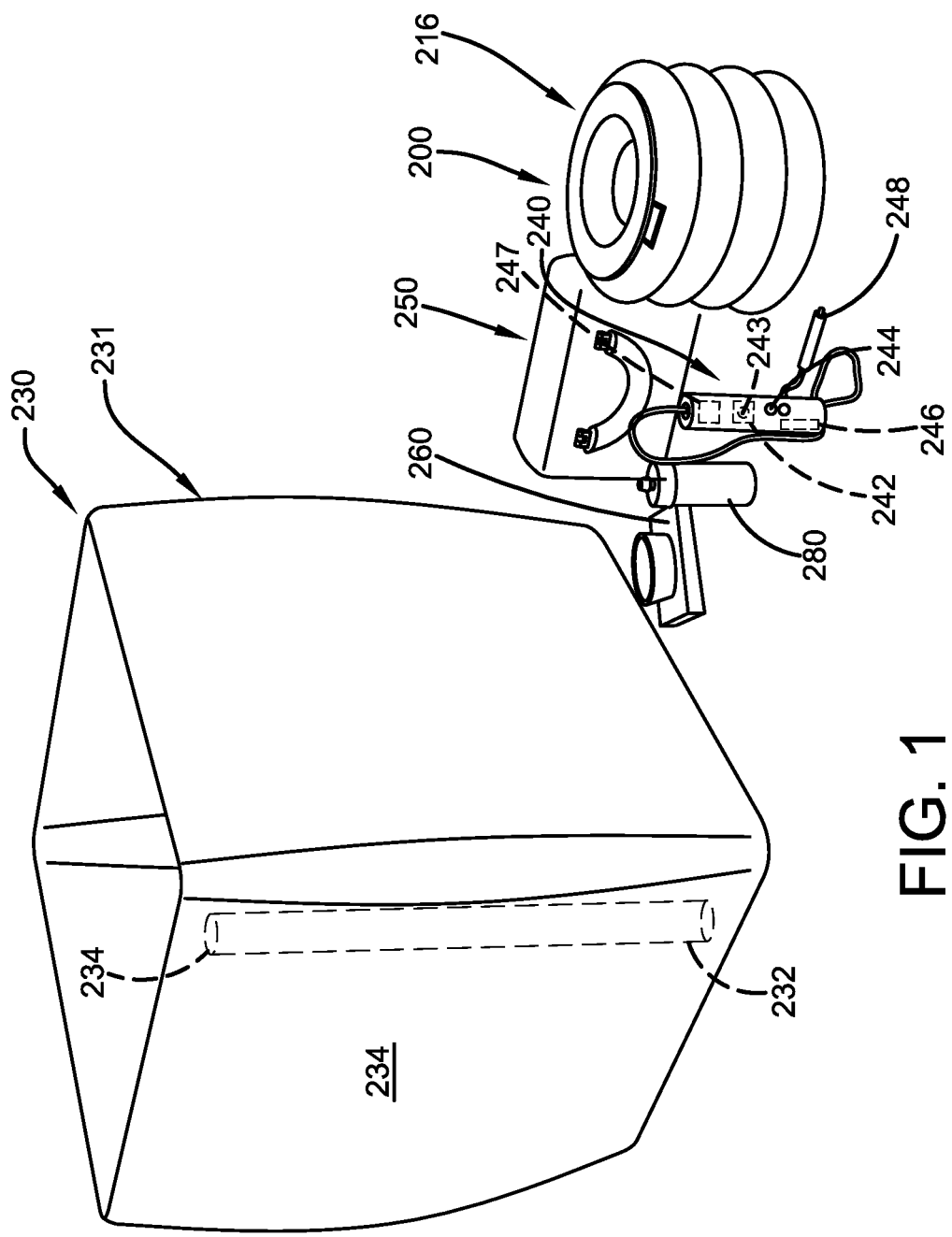
FIG. 1 illustrates a perspective view of the component of one potential embodiment of a portable toilet system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a system that provides a user with the amenities and comforts of a restroom. Further, there exists a long-felt need in the art for a portable toilet system that provides a user with the amenities and comforts of a restroom wherein the system can be used wherever needed. In addition, there exists a long-felt need in the art for a portable toilet system that can be used in public while concealing the user from view and provides privacy.

The present invention, in one exemplary embodiment, is comprised of a portable toilet system primarily comprised of at least one inflatable toilet, at least one privacy screen, and at least one pump. The toilet preferably has a body that is generally cylindrical in shape in the preferred embodiment and has a top opening that receives at least one bowl member. The bowl member preferably has a lip that circumferentially surrounds the top of the bowl member. As a result, the bowl member can be placed into the top opening in a removable fashion wherein the lip rests on the top surface of the body. The bowl member further collects feces and urine from a user as they use the toilet. In addition, the bowl member may further receive at least one waste bag liner that can be placed into the bowl member prior to defecating or urinating in the bowl member.

The body may further be manually inflated (i.e., blowing) using at least one valve that is preferably located on the side surface of the body or via at least one air pump that can be used to inflate the body. The air pump is further comprised of at least one battery which may be recharged by a USB port and powers at least one motor which then powers at least one fan that blows air through a nozzle with can be inserted into the valve to inflate the toilet.

The system is also comprised of a privacy screen which is preferably collapsible and has a body that is preferably rectangular in shape. The body may further have at least one opening that receives at least one frame member that can be inserted into the body to give the body structural support. The body preferably has no top wall or bottom wall to allow a user to stand comfortably within the body.

In addition, the system may be comprised of at least one wet wipe and/or toilet paper wipe or similar wipe of the like. Further, the system may also include at least one water bottle that a user can use to clean the bowl member or their buttocks and/or genitals as needed. All components of the system can be stored in a carrying case when not in use and for transport purposes.

The system may also be comprised of a method of using the system. First, the toilet, privacy screen, pump, wipes, waste bag liner, and water bottle can be removed from the carrying case. Next, the privacy screen can be erected by inserting the frame member into the body of the screen, wherein the toilet can then be inflated manually or by using the pump. Next, the toilet can be placed within the privacy screen such that the screen surrounds the toilet. Then, a user can then place the bowl member into the top surface of the body and place a waste bag liner into the bowl member. A user can then sit on the toilet and defecate or urinate into the bowl member and a user can use wipes as needed to clean themselves. Then, the waste bag liner can be removed from the bowl member and disposed of. The water bottle can then be used to clean the bowl member or toilet as needed. Next, the toilet can be deflated, and the privacy screen can be unassembled by removing the frame member from the body. Finally, the toilet, privacy screen, pump, wipes, waste bag liner, and water bottle can be placed back into the carrying case.

Accordingly, the portable toilet system of the present invention is particularly advantageous as it provides a user with the amenities and comforts of a restroom. Further, the system can be used wherever needed while concealing the user from view and providing privacy. In this manner, the portable toilet system provides a novel portable restroom solution that can be used when traditional restrooms are not available.

Referring initially to the drawings, FIG. 1 illustrates a perspective view of the component of one potential embodiment of a portable toilet system 100 of the present invention in accordance with the disclosed architecture. The system 100 is primarily comprised of at least one inflatable toilet 200, at least one privacy screen 230, and at least one pump 240. The toilet 200 preferably has a body 110 that is generally cylindrical in shape in the preferred embodiment. However, in differing embodiments the body 110 may be any shape such as, but not limited to: square, rectangular, circular, etc. Further, the body 110 is preferably manufactured from an inflatable material such as, but not limited to: Neoprene, silicone, nitrile, EPDM, Styrene-Butadiene, Butyl, natural, fluorosilicone, etc., or other inflatable material. The body 110 is also preferably accordion-like in shape such that it can easily collapse once deflated.

Figure 2:
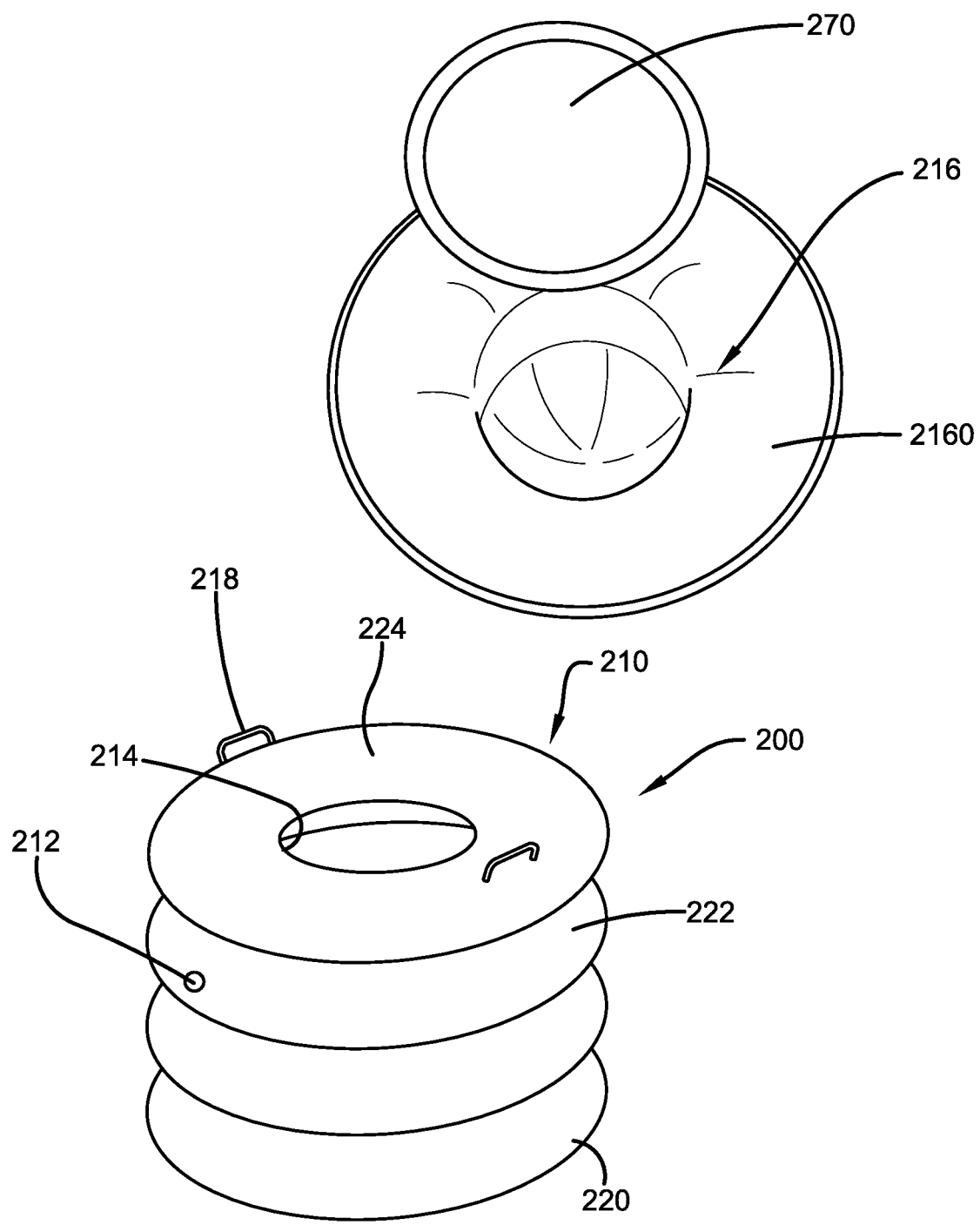
FIG. 2 illustrates an exploded perspective view of the toilet of one potential embodiment of a portable toilet system of the present invention in accordance with the disclosed architecture.

As seen in FIG. 2, the body 110 further has a top opening 214. The top opening 214 further receives at least one bowl member 216. The bowl member 216 preferably has a lip 2160 that circumferentially surrounds the top of the bowl member 216 such that the bowl member 216 can be placed into the top opening 214 in a removable fashion. More specifically, the lip 2160 rests on the top surface 224 of the body 210. The bowl member 216 further collects feces and urine from a user as they use the toilet 200. In one embodiment, the bowl member 216 may further receive at least one waste bag liner 270. The liner 270 is preferably manufactured from a plastic material that is preferably waterproof. The liner 270 can be placed into the bowl member 216 prior to defecating or urinating in the bowl member 216. In this manner, the bowl member 216 remains clean and the liner 270 can be easily removed from the bowl member 216 to discard urine and feces within the liner 270 after the toilet 200 has been used.

The top surface 224 of the body 210 is preferably further comprised of at least one handle 218 that can be grasped by a user while using the toilet 200 to better stabilize a user. The bottom surface 220 of the body 210 may further be manufactured from a rigid plastic material to provide additional structural support to the toilet 200 as it rests on a surface.

The body 210 may further be manually inflated (i.e., blowing) using at least one valve 212 that is preferably located on the side surface 222 of the body 210. In one embodiment, the system 100 is comprised of at least one air pump 240 that can be used to inflate the body 210. The air pump 240 is further comprised of at least one battery 242. The battery 242 may be a disposable battery 242 or a rechargeable battery 242 in the form of an alkaline, nickel-cadmium, nickel-metal hydride battery 242, etc., such as any 3V-12 volts DC battery 242 or other conventional battery 242 such as A, AA, AAA, etc. that supply power to the device 100. Throughout this specification the terms "battery" and "batteries" may be used interchangeably to refer to one or more wet or dry cells or batteries 242 of cells in which chemical energy is converted into electricity and used as a source of DC power. References to recharging or replacing batteries 242 may refer to recharging or replacing individual cells, individual batteries 242 of cells, or a package of multiple battery cells as is appropriate for any given battery 242 technology that may be used. Additionally, the battery 242 may be recharged by a USB port 170 such as, but not limited to, USB C or Micro-USB. The battery 242 further powers at least one motor 246 which then powers at least one fan 247 that blows air through a nozzle 248 with can be inserted into the valve 212 to inflate the toilet 200. The pump 240 is further comprised of at least one button 244 that may allow the pump 240 to be turned on and off. The motor 246 and/or fan 247 may further have a plurality of speeds or intensity settings.

The system 100 is also comprised of a privacy screen 230. The screen 230 is collapsible and has a body 231 that is preferably rectangular in shape. However, the body 231 may be any shape known in the art in differing embodiments. The body 231 may further have at least one opening 234 that receives at least one frame member 232. The frame member 232 can be inserted into the body 231 to give the body structural support. The body 231 is preferably manufactured from an opaque fabric material such as, but not limited to: vinyl, canvas, cashmere, chenille, chiffon, cotton, damask, jersey, lace, linen, wool, modal, polyester, satin, silk, spandex, suede, tweed, twill, velvet, acrylic, modacrylic, nylon, polypropylene, polyurethane, polyvinyl chloride, polyethylene, vinylidene, benzoate, aramid, rayon, acetate, triacetate, etc. To collapse the body 231, the frame members 232 can be removed from the body 231 and the body 231 can be folded. The body 231 preferably has no top wall or bottom wall to allow a user to stand comfortably within the body 231.

Figure 3:
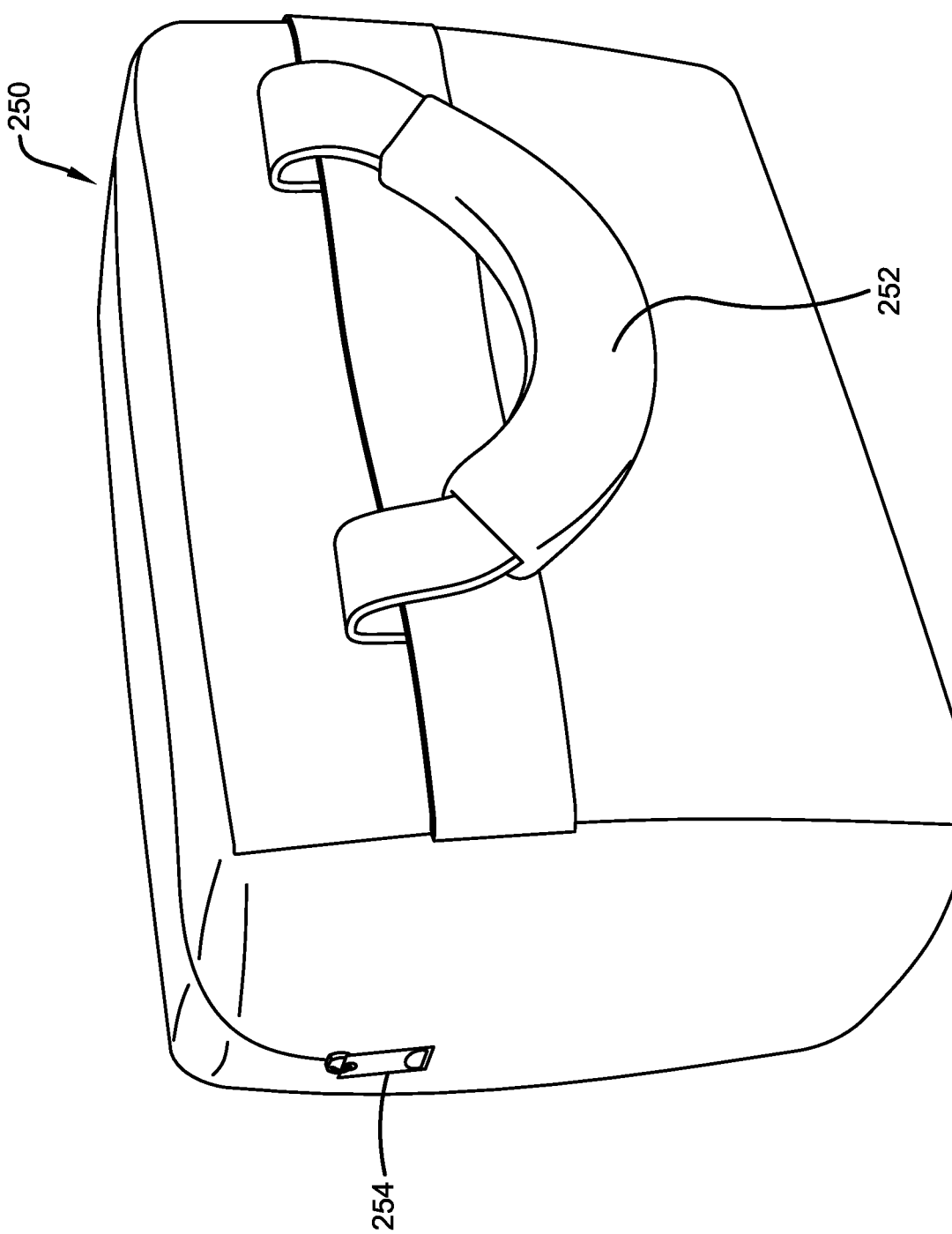
FIG. 3 illustrates a perspective view of the carrying case of one potential embodiment of a portable toilet system of the present invention in accordance with the disclosed architecture.

In addition, the system 100 may be comprised of at least one wet wipe 260 and/or toilet paper wipe or similar wipe of the like. The system 100 may also be comprised of at least one water bottle 280 that a user can use to clean the bowl member 216 or their buttocks and/or genitals as needed. As seen in FIG. 3, all components of the system 100 can be stored in a carrying case 250 when not in use and for transport purposes. The carrying case 250 is further preferably comprised of at least one handle 252 and at least one fastener 254 such as, but not limited to, a zipper that allows the case 250 to be securely closed.

Figure 4:
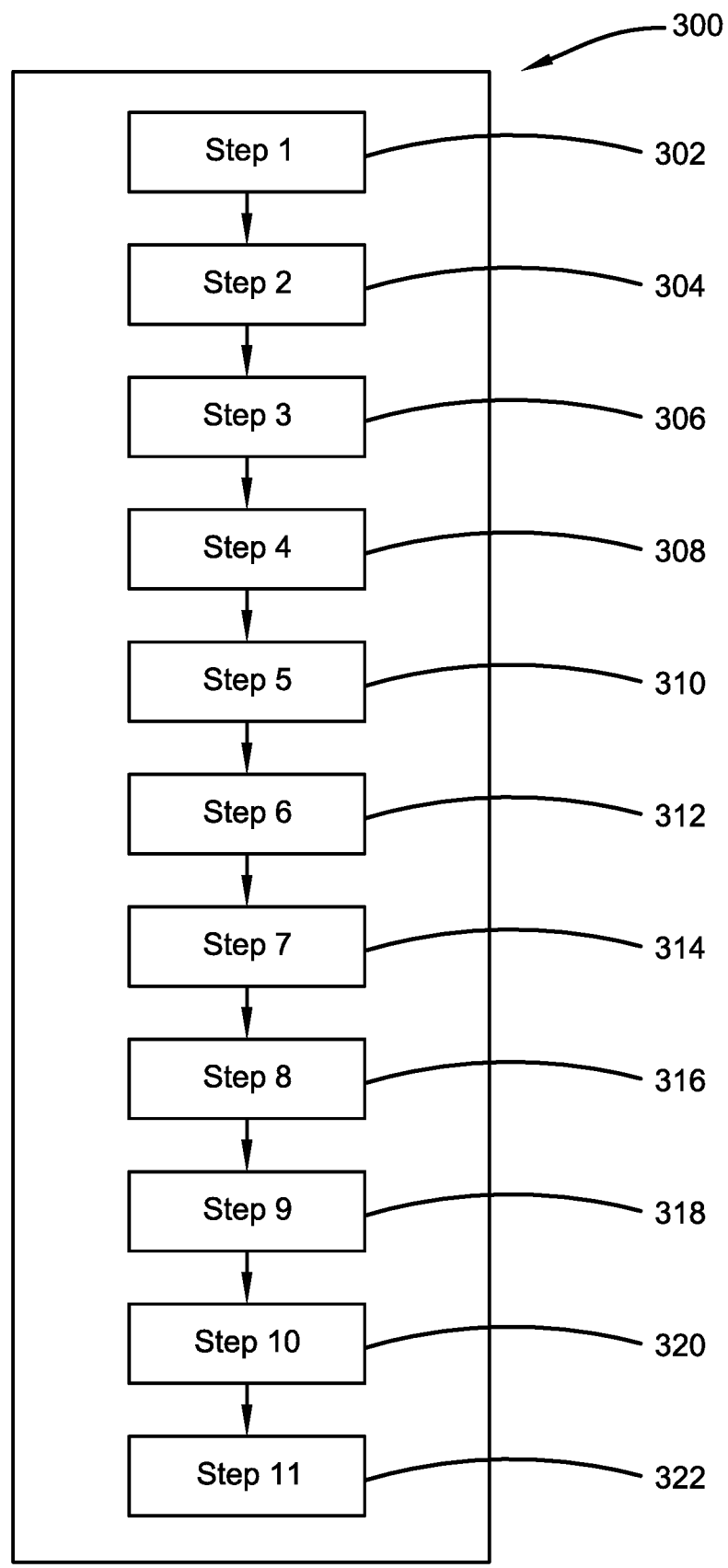
FIG. 4 illustrates a flowchart of one potential method of using one potential embodiment of a portable toilet system of the present invention in accordance with the disclosed architecture.

FIG. 4 illustrates a flowchart of one potential method 300 of using one potential embodiment of a portable toilet system 100 of the present invention in accordance with the disclosed architecture. The system 100 may also be comprised of a method 300 of using the system 100. First, the toilet 200, privacy screen 230, pump 240, wipes 260, waste bag liner 270, and water bottle 280 can be removed from the carrying case 250 [Step 302]. Next, the privacy screen 230 can be erected by inserting the frame member 232 into the body 231 of the screen 230 [Step 304]. Then, the toilet 200 can be inflated manually or by using the pump 240 [Step 306]. Next, the toilet 200 can be placed within the privacy screen 230, such that the screen 230 surrounds the toilet 200 [Step 308]. A user can then place the bowl member 216 into the top surface 224 of the body 210 and place a waste bag liner 270 into the bowl member [Step 310]. Then, a user can sit on the toilet 200 and defecate or urinate into the bowl member 216 [Step 312]. Next, a user can use wipes 260 as needed to clean themselves [Step 314]. Then, the waste bag liner 270 can be removed from the bowl member 216 and disposed [Step 316]. The water bottle 280 can then be used to clean the bowl member 216 or toilet 200 as needed [Step 318]. Next, the toilet 200 can be deflated and the privacy screen 230 can be unassembled by removing the frame member 232 from the body 231 [Step 320]. Finally, the toilet 200, privacy screen 230, pump 240, wipes 260, waste bag liner 270, and water bottle 280 can be placed back into the carrying case 250 [Step 322].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "portable toilet system" and "system" are interchangeable and refer to the portable toilet system 100 of the present invention.

Notwithstanding the foregoing, the portable toilet system 100 of the present invention and its various components can be of any suitable size and configuration as is known in the art without affecting the overall concept of the invention, provided that they accomplish the above-stated objectives. One of ordinary skill in the art will appreciate that the size, configuration and material of the portable toilet system 100 as shown in the FIGS. are for illustrative purposes only, and that many other sizes and shapes of the portable toilet system 100 are well within the scope of the present disclosure. Although the dimensions of the portable toilet system 100 are important design parameters for user convenience, the portable toilet system 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A portable toilet system comprising:
an inflatable toilet comprising an accordion shaped body configured to collapse upon itself when deflated;
a bowl member comprising a circumferential lip surrounding a top of the bowl member and configured to rest on a top surface of the accordion shaped body when inflated so that the bowl member is retainable within an opening in the top surface of the accordion shaped body;
a waste bag liner;
a privacy screen; and
wherein the top surface of the accordion shaped body further comprises a rigid plastic stabilizing handle.

2. The portable toilet system of claim 1 further comprising a pump.

3. The portable toilet system of claim 1, wherein the inflatable toilet is further comprised of a valve.

4. The portable toilet system of claim 1, wherein the waste bag liner can be received by the bowl member.

5. A portable toilet system comprising:
an inflatable toilet comprised of an accordion shaped body configured to collapse upon itself when deflated, a valve, a top surface comprising a rigid plastic stabilizing handle, and an opening in the top surface;
a bowl member comprising a circumferential lip surrounding a top of the bowl member and configured to rest on the top surface of the accordion shaped body when inflated so that the bowl member is retainable within the opening in the top surface of the accordion shaped body;
a waste bag liner;
a privacy screen;
a carrying case comprising a zipper;
an air pump;
a battery;
a wet wipe; and
a water bottle.

6. The portable toilet system of claim 5 further comprising a frame member.

7. The portable toilet system of claim 6, wherein the frame member can be inserted into the privacy screen.

8. The portable toilet system of claim 5, wherein the bowl member receives the waste bag liner.

9. The portable toilet system of claim 8, wherein the waste bag liner is comprised of a waterproof material.

10. The portable toilet system of claim 8, wherein the air pump is comprised of a nozzle.

11. The portable toilet system of claim 10, wherein the air pump is further comprised of a fan.

12. The portable toilet system of claim 11, wherein the fan has a plurality of speeds.

13. The portable toilet system of claim 10, wherein the air pump is further comprised of a USB port.

14. The portable toilet system of claim 8, wherein a bottom surface of the inflatable toilet is comprised of a rigid plastic material.

15. The portable toilet system of claim 8, wherein the privacy screen is comprised of an opaque material.

16. A method of using a portable toilet system, the method comprising the steps of:
removing an inflatable toilet, a privacy screen, an air pump, a wet wipe, a waste bag liner, and a water bottle from a carrying case;
erecting the privacy screen by inserting a frame member into a body of the privacy screen;
inflating the inflatable toilet;
surrounding the inflatable toilet with the privacy screen;
placing a bowl member into the inflatable toilet;
placing a waste bag liner into the bowl member;
sitting on and using the inflatable toilet to defecate and/or urinate;
using a wet wipe;
removing the waste bag liner from the bowl member;
disposing of the waste bag liner;
using a water bottle to clean the bowl member or the inflatable toilet;
deflating the inflatable toilet;
un-assembling the privacy screen by removing the frame member from the body of the privacy screen; and
placing the inflatable toilet, the privacy screen, the air pump, the wet wipe, the waste bag liner, and the water bottle back into the carrying case and securing the carrying case with a zipper; and
wherein the inflatable toilet comprises an accordion shaped body configured to collapse upon itself when deflated, a valve, a top surface comprising a rigid plastic stabilizing handle, and an opening in the top surface; and wherein the bowl member comprises a circumferential lip surrounding a top of the bowl member and configured to rest on the top surface of the accordion shaped body when inflated so that the bowl member is retainable within the opening in the top surface of the accordion shaped body.

17. The method of claim 16, wherein the inflatable toilet can be inflated manually or using an air pump.

* * * * *